United States Patent [19]
Allen et al.

[11] Patent Number: 5,983,026
[45] Date of Patent: Nov. 9, 1999

[54] ONE-TIME-USE CAMERA WITH VARIABLE FORMAT FILM ENCODER

[75] Inventors: Michael R. Allen, Churchville; Douglas H. Pearson, Rochester, both of N.Y.

[73] Assignee: Eastman Kodak Company, Rochester, N.Y.

[21] Appl. No.: 09/096,107

[22] Filed: Jun. 11, 1998

[51] Int. Cl.[6] .................... G03B 17/02; G03B 17/24; G03B 13/10
[52] U.S. Cl. ................ 396/6; 396/299; 396/317; 396/380; 396/543
[58] Field of Search .................. 396/6, 297, 298, 396/299, 378, 380, 543, 348, 349, 350, 448, 310, 315, 317

[56] References Cited

U.S. PATENT DOCUMENTS

| | | | |
|---|---|---|---|
| 3,430,019 | 2/1969 | Krautwald et al. | 200/245 |
| 3,527,913 | 9/1970 | Gionet et al. | 200/559 |
| 3,619,532 | 11/1971 | Lyvang | 200/275 |
| 4,010,339 | 3/1977 | Owen et al. | 200/292 |
| 4,144,430 | 3/1979 | Coldren et al. | 200/245 |
| 4,350,855 | 9/1982 | Bobb et al. | 200/292 |
| 4,357,510 | 11/1982 | Fortuna | 200/283 |
| 4,384,177 | 5/1983 | Kakuta | 200/5 R |
| 4,558,513 | 12/1985 | Buss | 29/622 |
| 4,624,049 | 11/1986 | Levko | 29/622 |
| 4,675,989 | 6/1987 | Galloway et al. | 29/622 |
| 4,950,847 | 8/1990 | Billman et al. | 200/16 D |
| 4,953,061 | 8/1990 | Mitkiewicz | 361/417 |
| 5,017,747 | 5/1991 | Nagahara et al. | 200/453 |
| 5,021,815 | 6/1991 | Harvey | 396/378 |
| 5,047,792 | 9/1991 | Asano et al. | 396/61 |
| 5,059,993 | 10/1991 | Harvey | 396/378 |
| 5,213,314 | 5/1993 | Kano et al. | 267/163 |
| 5,446,251 | 8/1995 | Lin et al. | 200/284 |
| 5,473,809 | 12/1995 | DuRocher et al. | 29/622 |
| 5,508,769 | 4/1996 | Inoue et al. | 396/349 |
| 5,545,864 | 8/1996 | Bauer et al. | 200/283 |
| 5,619,737 | 4/1997 | Horning et al. | 396/195 |
| 5,867,742 | 2/1999 | Salvas et al. | 396/263 |

*Primary Examiner*—Eddie C. Lee
*Attorney, Agent, or Firm*—Roger A. Fields

[57] ABSTRACT

A variable format camera comprising a front cover part having a particular-format viewfinder opening, and at least one other-format mask movable beneath the front cover part into alignment with the viewfinder opening to change the format of the view through the viewfinder opening to that of the mask and out of alignment with the viewfinder opening, is characterized in that a format-encodement-on-film switch is actuatable to provide a format encodement on a filmstrip in the camera; the mask has a switch actuator for actuating the encodement switch; and a rigid support for the switch actuator maintains a gap between the switch actuator and the encodement switch when the switch actuator does not actuate the encodement switch, to prevent the switch actuator from accidentally actuating the encodement switch because the front cover part is pressed inwardly.

2 Claims, 7 Drawing Sheets

FIG. 7

ONE-TIME-USE CAMERA WITH VARIABLE FORMAT FILM ENCODER

FIELD OF THE INVENTION

The invention relates generally to the field of photography, and in particular to cameras. More specifically, the invention relates to a one-time-use camera with a variable format film encoder.

BACKGROUND OF THE INVENTION

Reloadable and one-time-use cameras for the new worldwide "Advanced Photo System" can give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The camera records the choice of print format magnetically and/or optically on one longitudinal edge of the filmstrip for each exposed image area. The standard encodement on film for the "H" format is the binary 0, 0, i.e. no recorded data bits. The standard encodement on film for the "P" format is either the binary 0, 1 or the binary 1, 0, i.e. one recorded data bit. The standard encodement on film for the "C" format is the binary 1, 1, i.e. two recorded data bits.

The photofinisher's equipment reads the optical or magnetic encodements on film, and automatically prints each print in the encoded "C", "H" or "P" format. A "C" format print is typically 4×6 inches. An "H" format print is typically 4×7 inches. And a "P" format print is typically 4×10 inches or 4×11.5 inches.

No matter which format is selected in the camera, "C", "H" or "P", the exposed image areas on the filmstrip are always in the "H" format. This allows re-prints to be made in any of the three formats rather than just in the selected format. This is a further advantage of the "Advanced Photo System".

In order for the photographer to know how much of the subject being photographed will be included in the "C", "H" or "P" format print, the viewfinder in the camera typically includes a variable state masking device, such as a mechanical masking blade or an electronic masking liquid crystal display, for framing the subject according to the particular format that is selected. A manually operated format selector is provided to change the state of the masking device to the view the desired format in the viewfinder. This is shown, for example, in U.S. Pat. No. 5,619,737 issued Apr. 8, 1997.

SUMMARY OF THE INVENTION

A variable format camera comprising a front cover part having a particular-format viewfinder opening, and at least one other-format mask movable beneath the front cover part into alignment with the viewfinder opening to change the format of the view through the viewfinder opening to that of the mask and out of alignment with the viewfinder opening, is characterized in that:

a format-encodement-on-film switch is actuatable to provide a format encodement on a filmstrip in the camera;

the mask has a switch actuator for actuating the encodement switch; and a rigid support for the switch actuator maintains a gap between the switch actuator and the encodement switch when the switch actuator does not actuate the encodement switch, to prevent the switch actuator from accidentally actuating the encodement switch because the front cover part is pressed inwardly. The switch actuator has an actuating surface that is moved into the gap to actuate the encodement switch when the mask is moved into or out of alignment with the viewfinder opening.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–7 partially show an alternative "H" and "P" format one-time-use camera 10 including an opaque main body part 12 and an electronic flash 14. An opaque front cover part 16 and a mating opaque rear cover part (not shown) house the main body part 12 and the electronic flash 14 between them.

The main body part 12 has a rearwardly open cartridge receiving chamber 18 for a known "Advanced Photo System" film cartridge 20 and a rearwardly open film roll chamber 22 for an unexposed film roll 24. An exposure chamber 26 with a front light-admitting opening, i.e. a front exposure aperture, 28 is located between the cartridge receiving and film roll chambers 18 and 22 for exposing successive image areas of a filmstrip 30 initially stored on the unexposed film roll 24 in the film roll chamber 22. A film winding thumbwheel (not shown) is rotatably supported on the main body part 12 and has a depending coaxial stem in coaxial engagement with the protruding end of a film spool (not shown) inside the film cartridge 20 in the cartridge receiving chamber 18. Winding rotation of the film winding thumbwheel (counter-clockwise in FIG. 1) similarly rotates the film spool to wind each exposed image area of the filmstrip 30 into the film cartridge 20.

The electronic flash 14 includes a substantially flat flash circuit board 32 on which is supported a flash tube 34, a flash reflector 36 and a transparent flash cover 38. The transparent flash cover 38 is located behind a flash opening 40 in the front cover part 16. See FIG. 1.

An "H" format defining viewfinder 42 includes a pair of optically aligned front and rear viewfinder lenses 44 and 46. The front viewfinder lens 44 is located behind an "H" format front viewfinder opening 48 in the front cover part 16. See FIG. 1. The rear viewfinder lens 46 is located in front of an "H" format rear viewfinder opening in the rear cover part (not shown). The encodement on film for the "H" format available in the "H" and "P" format one-time-use camera 10 is a binary 0, 0, i.e. no recorded data bits.

Figure 1:
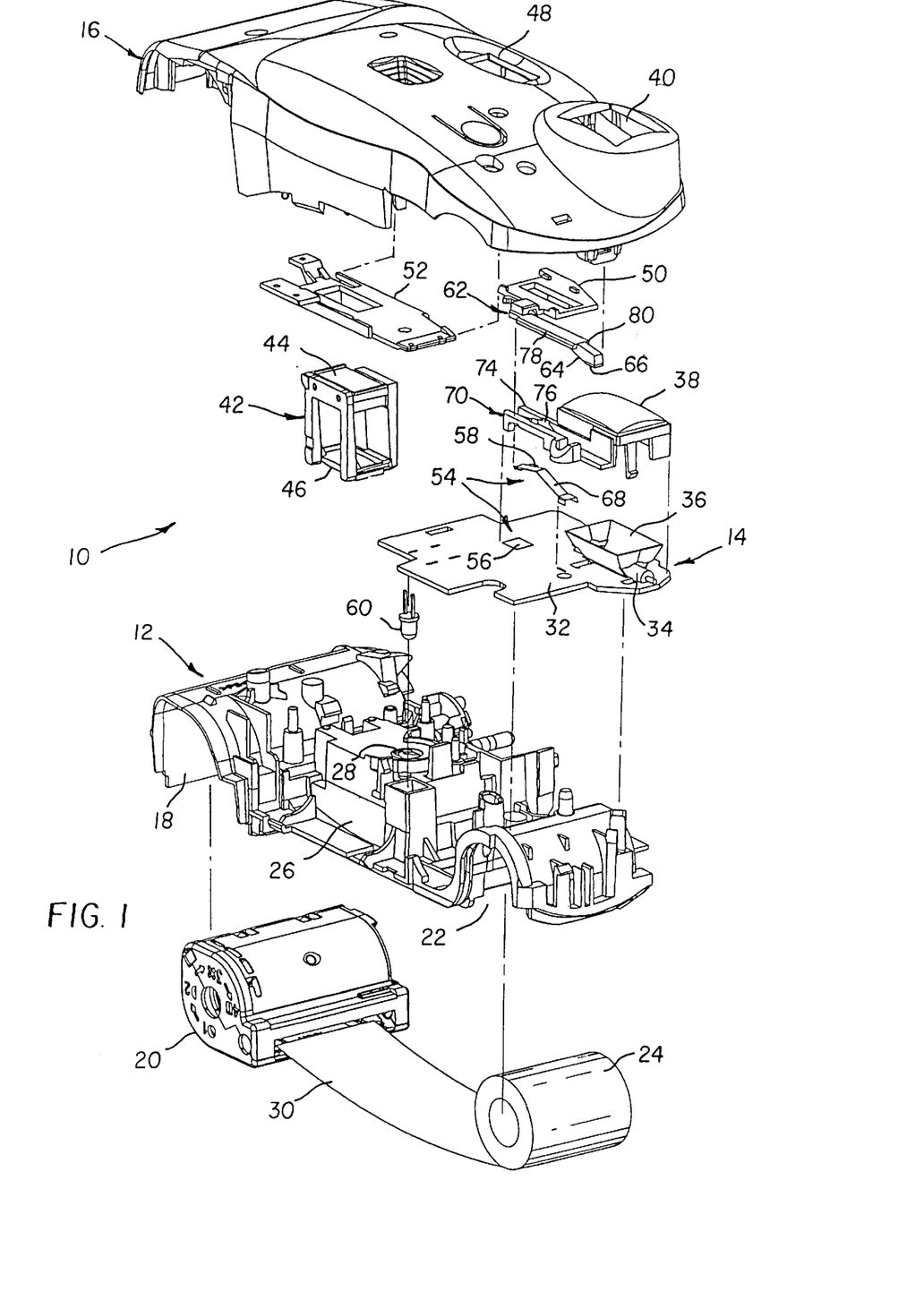
FIG. 1 is an exploded front perspective view of an alternative "H" and "P" format one-time-use camera according to a preferred embodiment of the invention.
Figure 2:
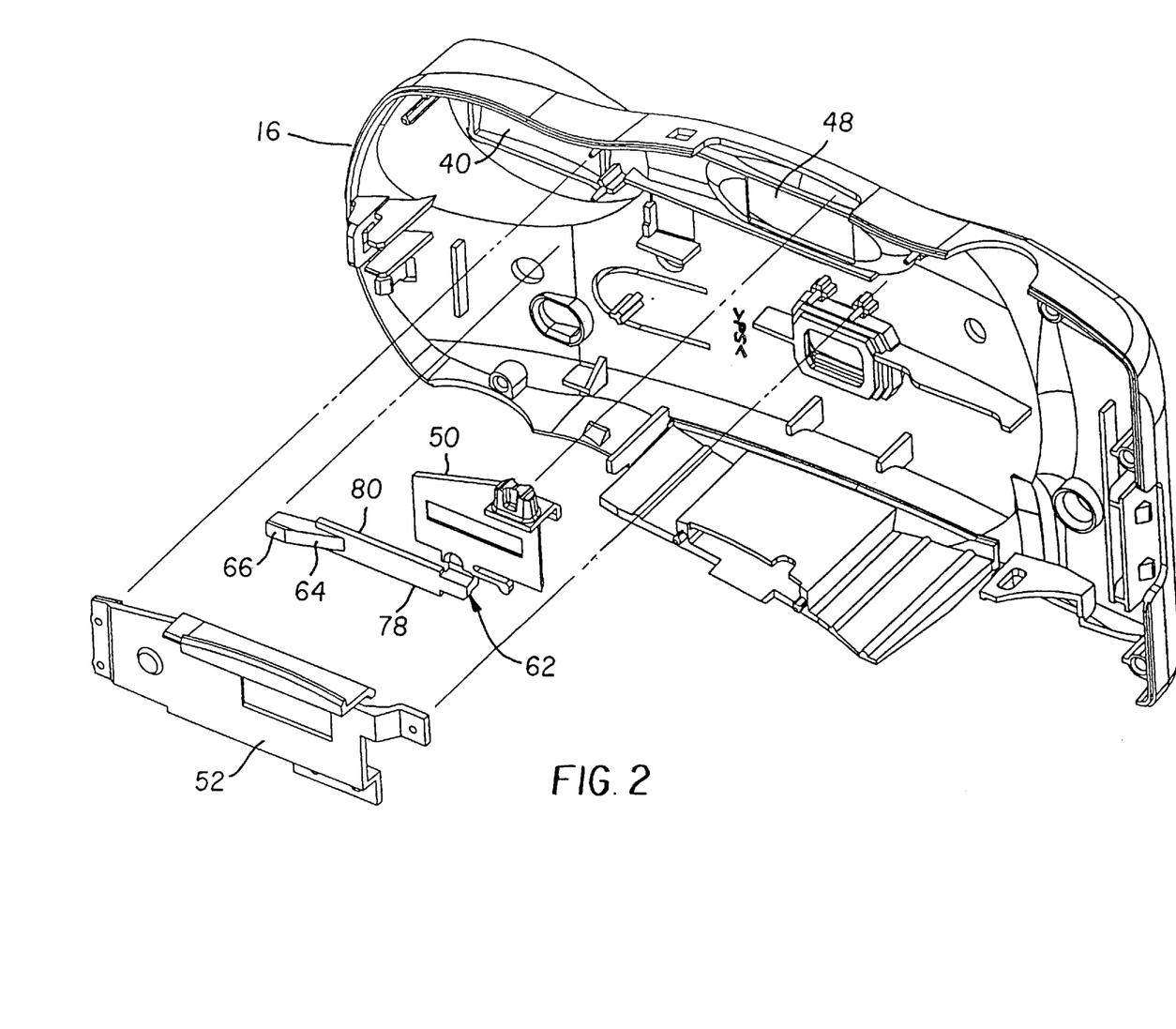
FIG. 2 is an exploded rear perspective view of a front cover part, a "P" format defining mask and a retainer for the mask in the camera.
Figure 3:
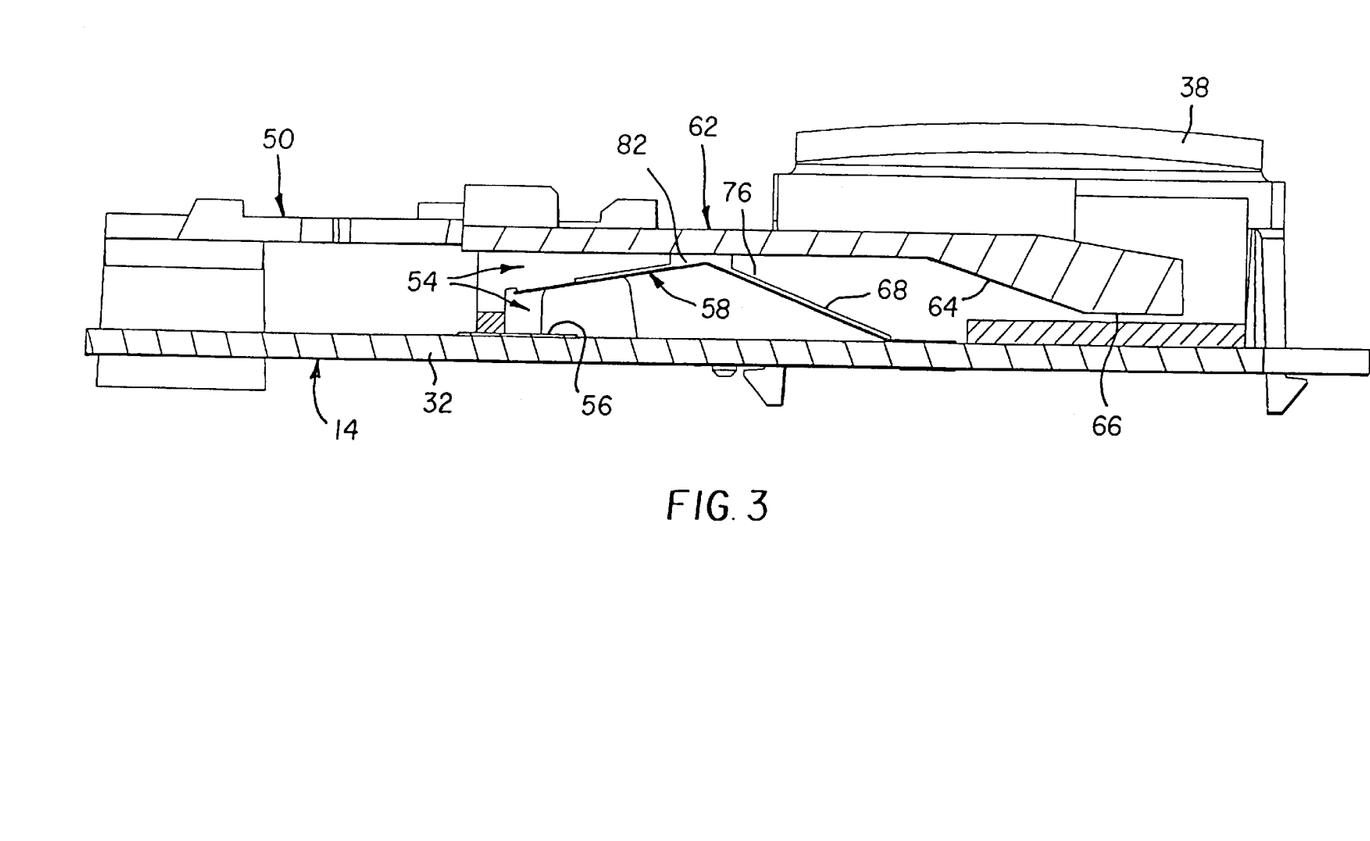
FIG. 3 is a section view of a "P" format-encodement-on-film closeable switch and a switch closing actuator in the camera.
Figure 4:
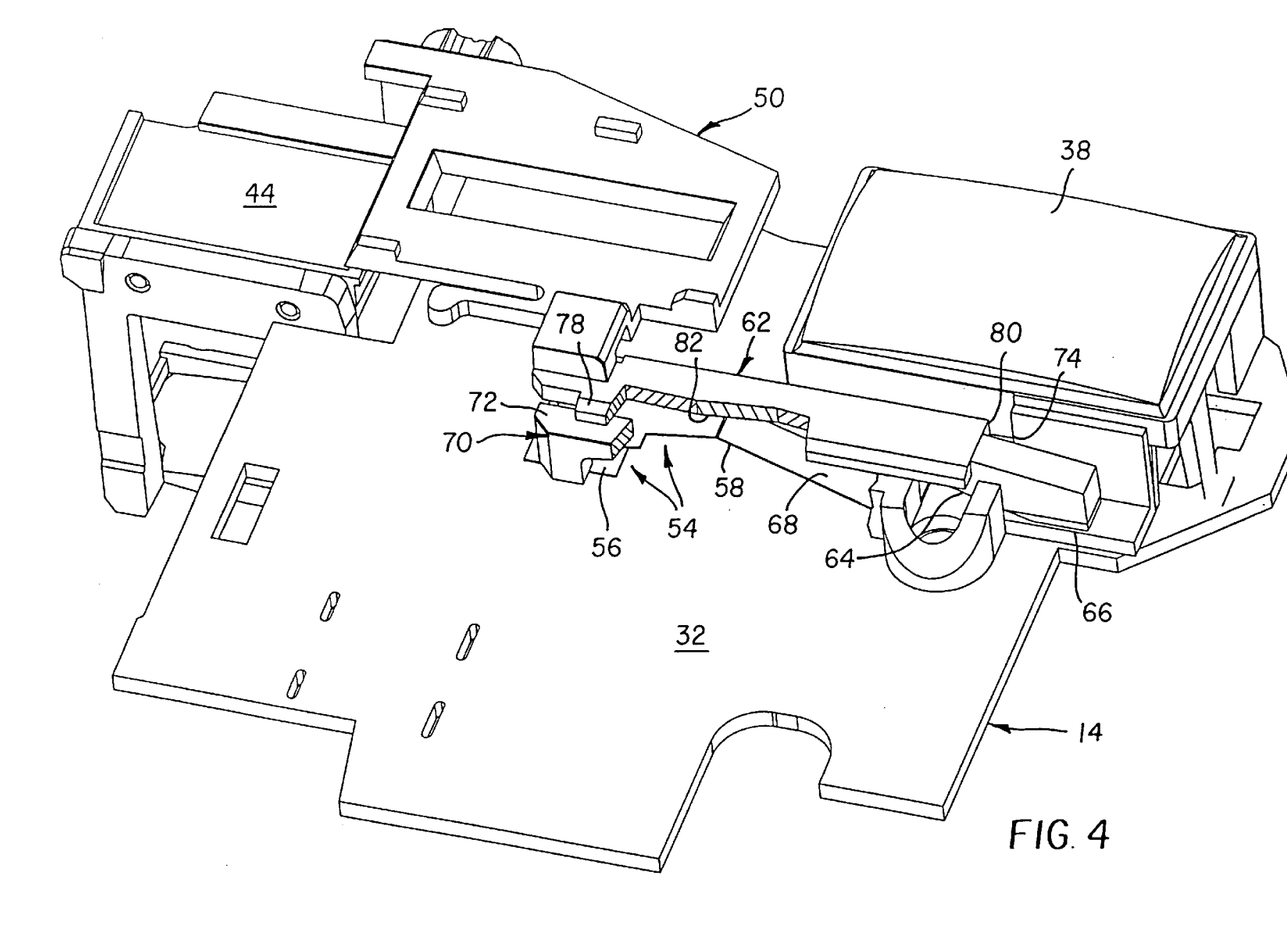
FIG. 4 is an assembled front perspective view of the "P" format defining mask, the "P" format-encodement-on-film closeable switch and the switch closing actuator in the camera, showing the camera in the "H" format mode.
Figure 5:
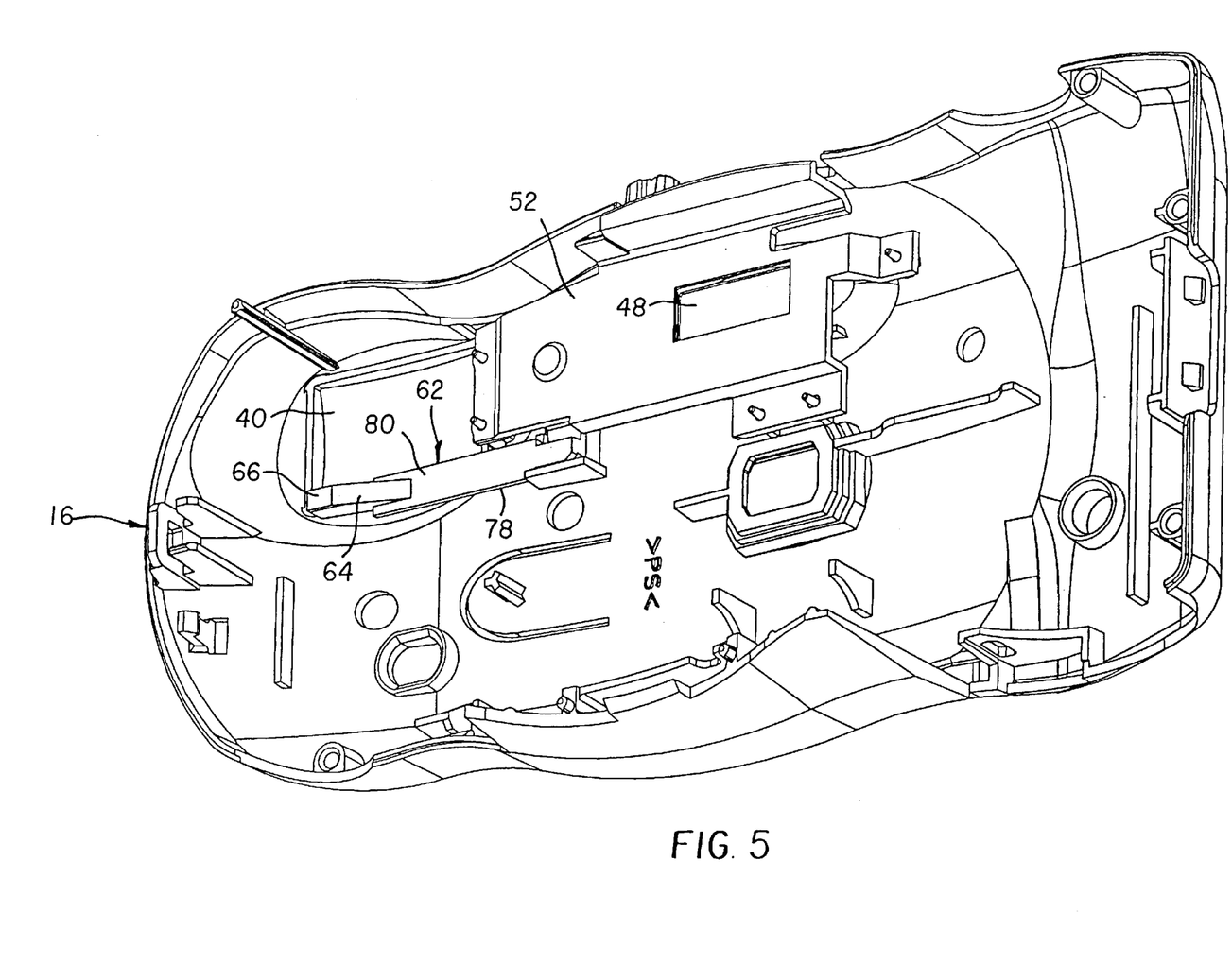
FIG. 5 is an assembled rear perspective view similar to FIG. 2, showing the camera in the "H" format mode.
Figure 6:
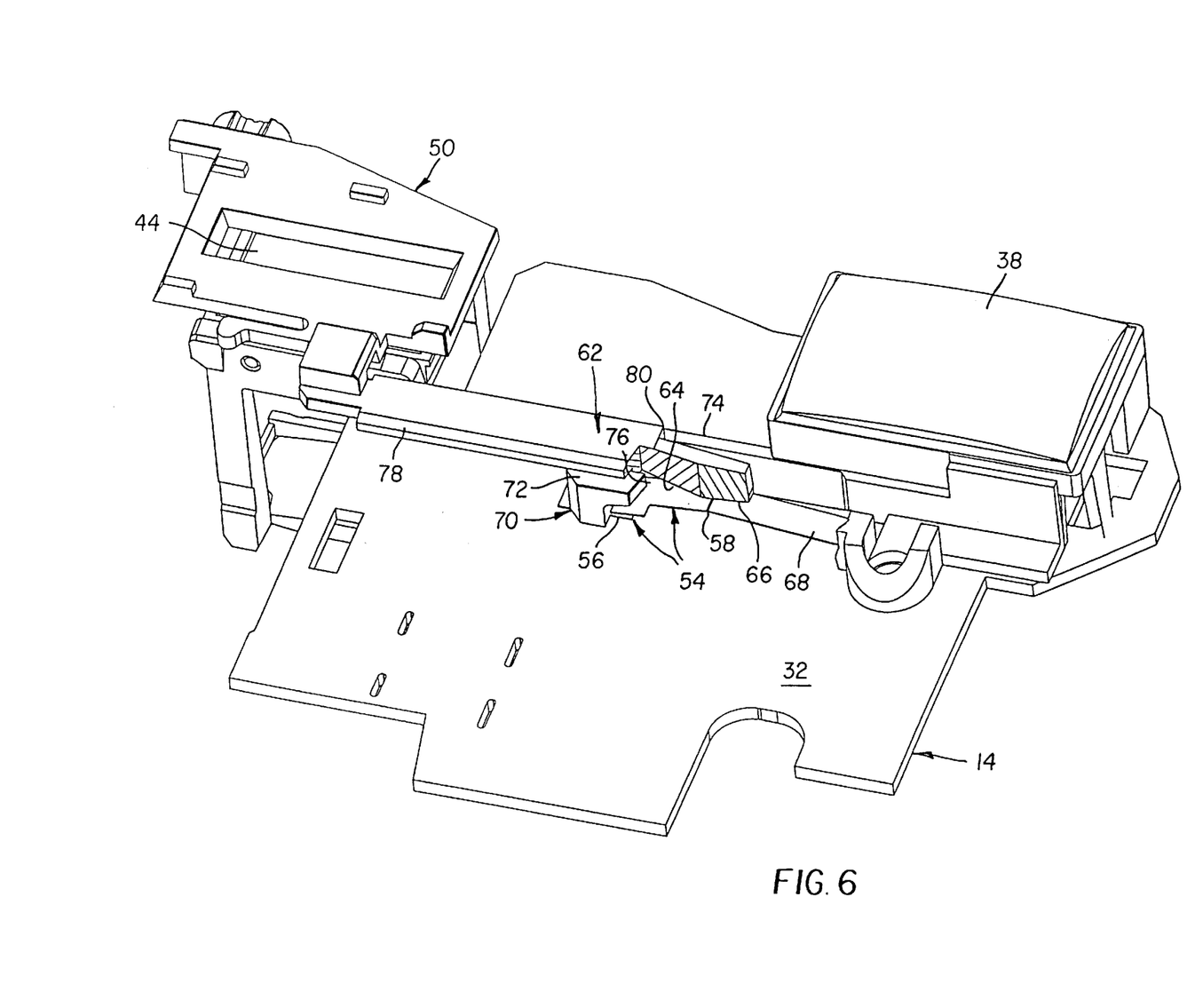
FIG. 6 is an assembled front perspective view similar to FIG. 4, showing the camera in the "P" format mode.
Figure 7:
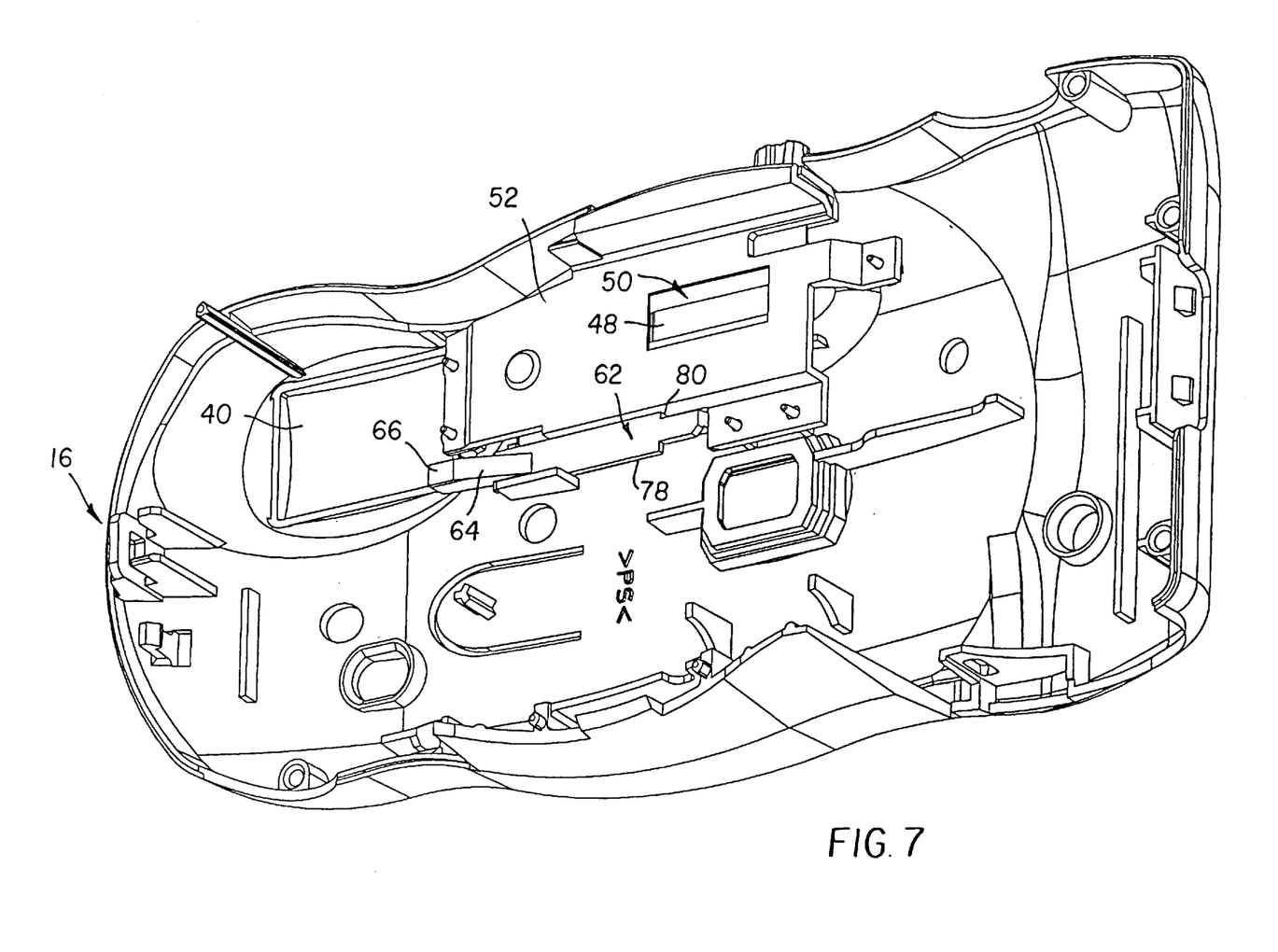
FIG. 7 is an assembled rear perspective view similar to FIG. 2, showing the camera in the "P" format mode.

A "P" format defining mask 50 is supported on the inside of the front cover part 16 for translation to an operative partial-masking position between the front viewfinder lens 44 and the front viewfinder opening 48 in the front cover part and an idle non-masking position removed from between the front viewfinder lens and the front viewfinder opening. FIGS. 4 and 5 show the "P" format defining mask 50 in its idle non-masking position. FIGS. 6 and 7 show the "P" format defining mask 50 in its operative partial-masking position. When the "P" format defining mask 50 in its operative partial-masking position, it is in alignment with the front viewfinder lens 44 and the front viewfinder opening 48. This changes the format of the view through the front and rear viewfinder openings to that of the mask, i.e. it changes the format from "H" to "P".

As shown in FIGS. 1, 2, 5 and 7, a mask retainer 52 is secured to the front cover part 16 beneath the "P" format defining mask 50.

A "P" format-encodement-on-film closeable switch 54 supported on the flash circuit board 32 comprises a fixed switch member 56 and a resilient movable switch member 58. See FIGS. 1, 3, 4 and 6. The movable switch member 58 is cantilevered and is actuated to move against the fixed switch member 56, in order to close the closeable switch 54.

A "P" format-encodement-on-film light emitting diode (LED) 60 is connected with the closeable switch 54 to be briefly illuminated responsive to shutter-opening when the switch is closed, in order to expose a single data bit, i.e. a binary 1, 0 on the filmstrip 30 adjacent an exposed image area. See FIGS. 1 and 6. Thus, the encodement on film for the "P" format to be used in the "H" and "P" format one-time-use camera 10 is the binary 1, 0, i.e. one recorded data bit.

No matter which format is selected in the camera 10, "H" or "P", the exposed image areas on the filmstrip 30 are always in the "H" format. The "H" format portion of an exposed image area on the filmstrip 30 has a width of approximately 27.4 mm and a height of approximately 15.6 mm. By contrast, the "P" format portion of an exposed image area of the filmstrip 30 has a width of approximately 27.4 mm and a height of approximately 9.6 mm.

As can be seen from FIGS. 6 and 7, when the "P" format defining mask 50 is translated from its idle non-masking position removed from between the front viewfinder lens 44 and the front viewfinder opening 48 in the front cover part 16 to its operative partial-masking position between the front viewfinder lens and the front viewfinder opening, a switch closing actuator 62 connected to the mask bears against the resilient movable switch member 58 to press that switch member against the fixed switch member 56, in order to close the "P" format-encodement-on-film closeable switch 54. Consequently, the "P" format-encodement-on-film LED 58 is briefly illuminated to expose a single data bit, i.e. the binary 1, 0, on the filmstrip 30 adjacent an exposed image area. The switch closing actuator 62 has an inclined actuating surface 64 followed by a flat holding surface 66 which in succession bear against an inclined follower surface 68 on the resilient movable switch member 58 to press that switch member against the fixed switch member 56.

The flash cover 38 includes an integral rigid support 70 with a pair of parallel rails 72 and 74 that have a space 76 in-between. See FIG. 1. The resilient movable switch member 58 and the switch closing actuator 62 each protrude into the space 76. See FIG. 2. The switch closing actuator 62 has a pair of longitudinal edge ribs 78 and 80 that are located on the respective rails 72 and 74, for the rails to support the switch closing actuator. The rails 72 and 74 maintain a gap 82, within the space 76, between the switch closing actuator 62 and the resilient movable switch member 58 when the "P" format defining mask 50 is in its idle non-masking position. See FIGS. 2 and 4. If one unintentionally presses the front cover part 16 severely inwardly, the gap 82 serves to prevent the switch closing actuator 62 from depressing the resilient movable switch member 58 against the fixed switch member 56 to accidentally close the closeable switch 54. When the "P" format defining mask 50 is translated from its idle non-masking position to its operative partial-masking position, the inclined actuating surface 64 and the flat holding surface 66 of the switch closing actuator are moved along the space 76 including into the gap 82 to bear against the inclined follower surface 68 on the resilient movable switch member 58, to press that switch member against the fixed switch member 56.

The invention has been described with reference to a preferred embodiment. However, it will be appreciated that variations and modifications can be effected by a person of ordinary skill in the art without departing from the scope of the invention.

Parts Lists

10. "H" and "P" format one-time-use camera
12. main body part
14. electronic flash
16. front cover part
18. cartridge receiving chamber
20. film cartridge
22. film roll chamber
24. unexposed film roll
26. exposure chamber
28. front light-admitting opening
30. filmstrip
32. flash circuit board
34. flash tube
36. flash reflector
38. flash cover
40. flash opening
42. "H" format defining viewfinder
44. front viewfinder lens
46. rear viewfinder lens
48. "H" format front viewfinder opening
50. "P" format defining mask
52. mask retainer
54. "P" format-encodement-on-film closeable switch
56. fixed switch member
58. movable cantilevered switch member
60. "P" format-encodement-on-film LED
62. switch closing actuator
64. inclined actuating surface
66. flat holding surface
68. inclined follower surface
70. rigid support
72. rails
74. rails
76. space 78. rib
80. rib
82. gap

What is claimed is:

1. A variable format camera comprising a front cover part having a particular-format viewfinder opening, and at least one other-format mask movable beneath said front cover part into alignment with said viewfinder opening to change the format of the view through the viewfinder opening to that of said mask and out of alignment with the viewfinder opening, is characterized in that:

- a format-encodement-on-film switch is actuatable to provide a format encodement on a filmstrip in said camera;
- said mask has a switch actuator for actuating said encodement switch;
- a rigid support for said switch actuator maintains a gap between the switch actuator and said encodement switch when the switch actuator does not actuate the encodement switch, to prevent the switch actuator from accidentally actuating the encodement switch because said front cover part is pressed inwardly;
- said switch actuator has an actuating surface that is moved into said gap to actuate said encodement switch when said mask is moved into alignment with said viewfinder opening; and
- said support has a pair of parallel rails with a space in-between that includes said gap, said encodement switch is located in said space, and said switch actuator is supported on said rails to position said actuating surface out of said gap when the actuating surface does not actuate said encodement switch and for movement along said space including into the gap for the actuating surface to actuate the encodement switch.

2. A variable format camera as recited in claim 1, wherein said encodement switch has a fixed switch member and a resilient cantilevered switch member movable against said fixed switch member to actuate the encodement switch, and said switch actuator has a pair of successive actuating and holding surfaces that are moved into said gap to first move said cantilevered switch member against said fixed switch member and then hold the cantilevered switch member against the fixed switch member when said mask is moved into alignment with said viewfinder opening.

* * * * *